United States Patent Office.

JOHN LIGHTFOOT, OF LOWERHOUSE, NEAR BURNLEY, ENGLAND.

Letters Patent No. 111,654, dated February 7, 1871.

IMPROVEMENT IN DYEING AND PRINTING TEXTILE FABRICS.

The Schedule referred to in these Letters Patent and making part of the same.

*To all whom it may concern:*

Be it known that I, JOHN LIGHTFOOT, of Lowerhouse, near Burnley, in the county of Lancaster, England, chemist, have invented new and useful Improvements in Printing and Dyeing Textile Fabrics and Yarns; and I do hereby declare that the following is a full and exact description thereof.

These improvements consist in the production of a black color or dye on textile fabrics or yarns by printing or staining them with a salt of aniline or any of its analogues, mixed with certain oxidizing agents, hereinafter described.

In one process I make the color as follows:

I take sixty ounces of chlorate of potash and dissolve it in six quarts of boiling water. I then dissolve in another vessel four and a half pounds of tartaric acid in six quarts of boiling water, and add by degrees four and a half pounds crystallized carbonate of soda, mixing this compound with the dissolved chlorate of potash at once. I allow the said mixture to stand until perfectly cold, then filter out the cream of tartar, and wash it with three quarts of cold water on the filter. I thus obtain chlorate of soda and cream of tartar sufficiently pure for the market. The washings are afterward added to the filtrate. The filtrate is then thickened with eighteen pounds of British gum (calcined starch) or ten pounds of starch, or a mixture of the two, heated from 150° Fahrenheit to 212° Fahrenheit, according to the thickening material made use of. I then mix two quarts of aniline (by preference Dale's No. 2) and three pints of the best hydrochloric acid at 32° Twaddell. I allow this mixture to stand until perfectly cold, and then mix it with the said thickened filtrate. When quite cold, and just before using the color, I add twelve to twenty-four ounces of sulphate-of-copper crystals, or any other suitable copper salt, or five and a half gills of sulphide-of-copper paste.

In another process I make the color as follows:

I dissolve sixty ounces of tartaric acid in six quarts of boiling water, adding by degrees twenty-five ounces of sesqui-carbonate of ammonia, or an equivalent quantity of caustic ammonia, so as to form a bi-tartarate of ammonia. I then dissolve in another vessel four pounds of chlorate of potash in six quarts of boiling water, and mix it at once with the bi-tartarate of ammonia. I allow the said mixture to stand until perfectly cold, and then filter out the cream of tartar, and wash it with three quarts of cold water. By this means I obtain chlorate of ammonia and cream of tartar sufficiently pure for the market, the washings being added to the filtrate and the filtrate thickened as described in the first process. I then add two quarts of aniline (by preference Dale's No. 2) and three pints of the best hydrochloric acid at 32° Twaddell. I allow this mixture to stand until perfectly cold, and then mix it with the said thickened filtrate. When quite cold, and just before using the color, I add twelve to twenty-four ounces of sulphate-of-copper crystals, or five and a half gills of sulphide-of-copper paste.

I print either of these colors, and age one night by hanging in a room at from 60° to 70° Fahrenheit, and raise in soda liquor about 1° Twaddell; wash, soap, and finish in the usual way. When these colors are printed along with madder or garancine mordants, hung and aged one night, they may be passed through ammoniacal gas, and are dunged, dyed, and finished in the usual manner.

In the process of dyeing I use either the chlorate-of-soda or the chlorate-of-ammonia processes before described, following exactly the same modes of procedure, with the exception of the use of the thickening matter; but I add in lieu thereof one pint of acetic acid, 8 T., one-half pound of common sugar to each gallon of dye liquor, and only about one and a half ounce per gallon of sulphate of copper, instead of the larger quantity added when the thickening madder is used.

I pad the cloth or dip the yarns in the said dye liquor, wring out, and dry in a cool room, age one night, as before, and raise in any weak alkali.

For either printing or dyeing purposes certain other metallic salts than copper may be used for producing a good black, such, for instance, as the soluble bi-chromates or mono-chromates of potash, soda, or ammonia, or the soluble salts of iron, their oxides or sulphides, or the soluble salts, oxides, or sulphides of uranium or vanadium, or the above-named metals may be used in a fine state of division, with the exception of chromium; but by preference I employ a soluble or insoluble salt of copper in all cases, for producing the best black.

I claim—

1. The mode or method of producing a black dye or color for fabrics or yarns, substantially as hereinbefore described.

2. The treatment of the substances hereinbefore described, whereby I obtain commercial cream of tartar fit for the market.

Done at Manchester this 30th day of November, 1870.

JOHN LIGHTFOOT.

Witnesses:
EDWARD JOSEPH HUGHES,
  *Patent Agent, Manchester.*
GEORGE SEPTIMUS HUGHES,
  *Patent Agent, Manchester.*